US005216453A

United States Patent [19]

Itoh

[11] Patent Number: 5,216,453

[45] Date of Patent: Jun. 1, 1993

[54] ELECTROPHOTOGRAPHIC PRINTER

[75] Inventor: Shinichi Itoh, Tokyo, Japan

[73] Assignee: Oki Electric Industry Co., Ltd., Tokyo, Japan

[21] Appl. No.: 721,397

[22] Filed: Jun. 26, 1991

[30] Foreign Application Priority Data

Jul. 10, 1990 [JP] Japan .............................. 2-180622

[51] Int. Cl.5 ........................................ G01D 15/06

[52] U.S. Cl. .............................. 346/153.1; 355/200; 355/271; 400/119

[58] Field of Search .......................... 346/153.1, 150; 355/281, 280, 271–272, 274–275, 277, 200, 212, 273; 400/119

[56] References Cited

U.S. PATENT DOCUMENTS

| | | | |
|---|---|---|---|
| 3,684,075 | 8/1972 | Staller et al. . | |
| 4,217,819 | 8/1980 | von Tluck et al. . | |
| 4,458,258 | 7/1984 | Amaya et al. | 346/153.1 |
| 4,763,157 | 8/1988 | Bujese | 355/274 |
| 4,845,519 | 7/1989 | Fuse | 346/153.1 |
| 5,057,875 | 10/1991 | Itoh | 355/277 X |

FOREIGN PATENT DOCUMENTS

| | | | |
|---|---|---|---|
| 0001987 | 5/1979 | European Pat. Off. . | |
| 56-077167 | 6/1981 | Japan . | |
| 0125780 | 10/1981 | Japan | 355/277 |
| 0185064 | 11/1982 | Japan | 355/279 |
| 0195258 | 11/1982 | Japan | 346/153.1 |
| 60-23033 | 6/1985 | Japan . | |
| 60-23034 | 6/1985 | Japan . | |
| 0057351 | 3/1986 | Japan | 346/153.1 |
| 0058757 | 3/1986 | Japan | 346/153.1 |
| 61-152463 | 7/1986 | Japan . | |
| 61-210380 | 9/1986 | Japan . | |
| 1064980 | 4/1967 | United Kingdom . | |
| 1380831 | 1/1975 | United Kingdom . | |
| 8400623 | 2/1984 | World Int. Prop. O. | 400/119 |
| 8909948 | 10/1989 | World Int. Prop. O. | 355/274 |

OTHER PUBLICATIONS

*Xerox Disclosure Journal*, vol. 4, No. 3, May/Jun. 1979, p. 371, "Line Printer", Lahr, R. J., Throuburg, D. D.

*Primary Examiner*—A. T. Grimley
*Assistant Examiner*—Matthew S. Smith
*Attorney, Agent, or Firm*—Spencer, Frank & Schneider

[57] ABSTRACT

In an electrophotographic printer, electrostatic latent images are formed on a surface of a photosensitive drum, toner images corresponding to the electrostatic latent images are formed on a toner image bearing belt, which is brought to confront a recording paper on a platen. When part of the toner image forming belt on which toner images for a one complete line is formed confronts the recording paper, a transfer member is moved laterally in the spacing direction while pressing the toner image bearing belt against the recording paper on the platen. The transferred toner image can be simultaneously fixed by application of heat from a heating member provided in the transfer member or in the platen.

34 Claims, 8 Drawing Sheets

ELECTROPHOTOGRAPHIC PRINTER

FIELD OF THE INVENTION

The present invention relates to a serial-type electrophotographic printer.

BACKGROUND OF THE INVENTION

Electrophotographic printers having an LED array as an exposure light source have been employed as a terminal for personal computers and work stations. In the conventional electrophotographic printers, the LED array is comprised of LED array chips each of which is made up of a plurality of LED elements formed on a single chip and arranged in a column. The LED array chips are disposed side by side in a line to provide a required dimension corresponding to the width of recording paper.

Because the brightness may vary from one LED array chip to another, it is necessary, in forming a line of LED array chips, to select chips having identical brightness. As a result, yield of chips is low. Moreover, the assembly takes much labor, resulting in a higher cost.

To improve this situation, electrophotograhic serial printer employing a single LED array chip have been proposed (Japanese Patent Kokoku Publication No. 23033/1985, and Japanese Patent Kokoku Publication No. 23034/1985). The electrophotograhic serial printers have a carriage moving back and fourth in a direction perpendicular to the direction of recording paper feeding, and devices for the respective processes of the electrophotography (charging, exposure, development, transfer, fixing and cleaning) are mounted on the carriage. Magnetic toner images formed on a photosensitive member are transferred to the recording paper, utilizing the magnetic forces, and fixed by applying heat from a heat source to the toner on the recording paper.

Systems using electrostatic forces to transfer toner images to the recording paper have also been proposed (Japanese Patent Kokai Publication No. 152463/1986). Transfer of the toner to the recording paper is made for a certain number of printing lines and the recording paper with the toner image unfixed is transported to a fixing means where the toner image is fixed.

A problem associated with the above prior-art electrophotographic printer is that a carriage moving in the line direction is mounted with all devices, i.e., charging, exposure, developing, fixing, etc., required by the processes of electrophotographic recording, rendering the mechanism complex.

For example the photosensitive member, developing device, charging device and so on require driving and transmission means for their rotation, and electrical signals are required to supply data for required charging and developing processes. A means for supplying electric power and electrical signals to a laterally moving carriage is complex, and there is a danger of disconnection (e.g., wire breaking) faults due to contact friction. Further, the many devices mounted on the carriage increase its mass thereby requiring a drive source and medium for transmission of power to be larger and stronger.

SUMMARY OF THE INVENTION

The invention aims at solving the problems in the prior-art electrophotographic printer.

An object of the invention is to provide a serial-type electrophotographic printer in which the structure of the carriage is simplified, the need for transmitting high voltages or electrical signals to the carriage is eliminated, and the drive system that provides lateral movement of the carriage can be made more compact.

An electrophotographic printer according to the invention comprises:

(a) a flat platen;

(b) a paper feed means for feeding recording paper over said platen along the surface of said platen in a first direction;

(c) toner image bearing member extending along the surface of the recording paper on said platen, said toner image bearing member extending in a second direction at an angle with respect to said first direction;

(d) means for forming a toner image on part of said toner image bearing member, and moving said part of the toner image bearing member on which the toner image has been formed, to the position confronting the recording paper on said platen, and halting the toner image bearing member when said part of the toner image bearing member has reach said position;

(e) a transfer member disposed opposite to the recording paper with respect to the toner image bearing member;

(f) a space-driving means for moving said transfer member in said second direction after said part of said toner image bearing member has reached said position;

(g) means for pressing the transfer member against the platen while said transfer member is moving in said second direction thereby to transfer the toner image from the toner image bearing member to the recording paper.

Recording paper on which the printing is made is fed and passed over the platen, between the platen and part of the toner image bearing member confronting the platen.

Electrostatic latent images corresponding to the electrical signals representing the desired print output are formed on the electrostatic latent image carrier, and corresponding toner images are formed on the toner image bearing member. The part of the toner image bearing member on which the toner images have been formed is transported to the position at which it confronts the recording paper on the platen. When the toner image for the complete line, i.e., for the entire width of the recording paper have been formed and confronts the recording paper, the carriage, particularly the transfer member is brought into contact with the toner image bearing member to press it against the recording paper on the platen, and the carriage is moved laterally, i.e., in the direction of the width of the recording paper, while pressing the toner image bearing member against the recording paper. As a result, the toner image on the toner image bearing member is transferred to the recording paper.

When one line of transfer is completed, the carriage is separated from or released from being pressed against the recording paper and the recording paper is line-fed. The formation of the toner image onto the toner image bearing member and the part of the transport of the toner image bearing member on which the toner images to be transferred next have been formed are again conducted, and the carriage is brought into contact with the recording paper, and the carriage is moved laterally, in the opposite direction to conduct the transfer for the next line. When the transfer for this line is completed, the carriage is separated from or released from being pressed against the toner image bearing member, and the recording paper is line-fed. Subsequent operations similar to those described above are repeated to form a desired print-out.

DETAILED DESCRIPTION OF THE PREFERRED EMBODIMENTS

An embodiment of the invention will now be described with reference to the drawings.

Figure 2:
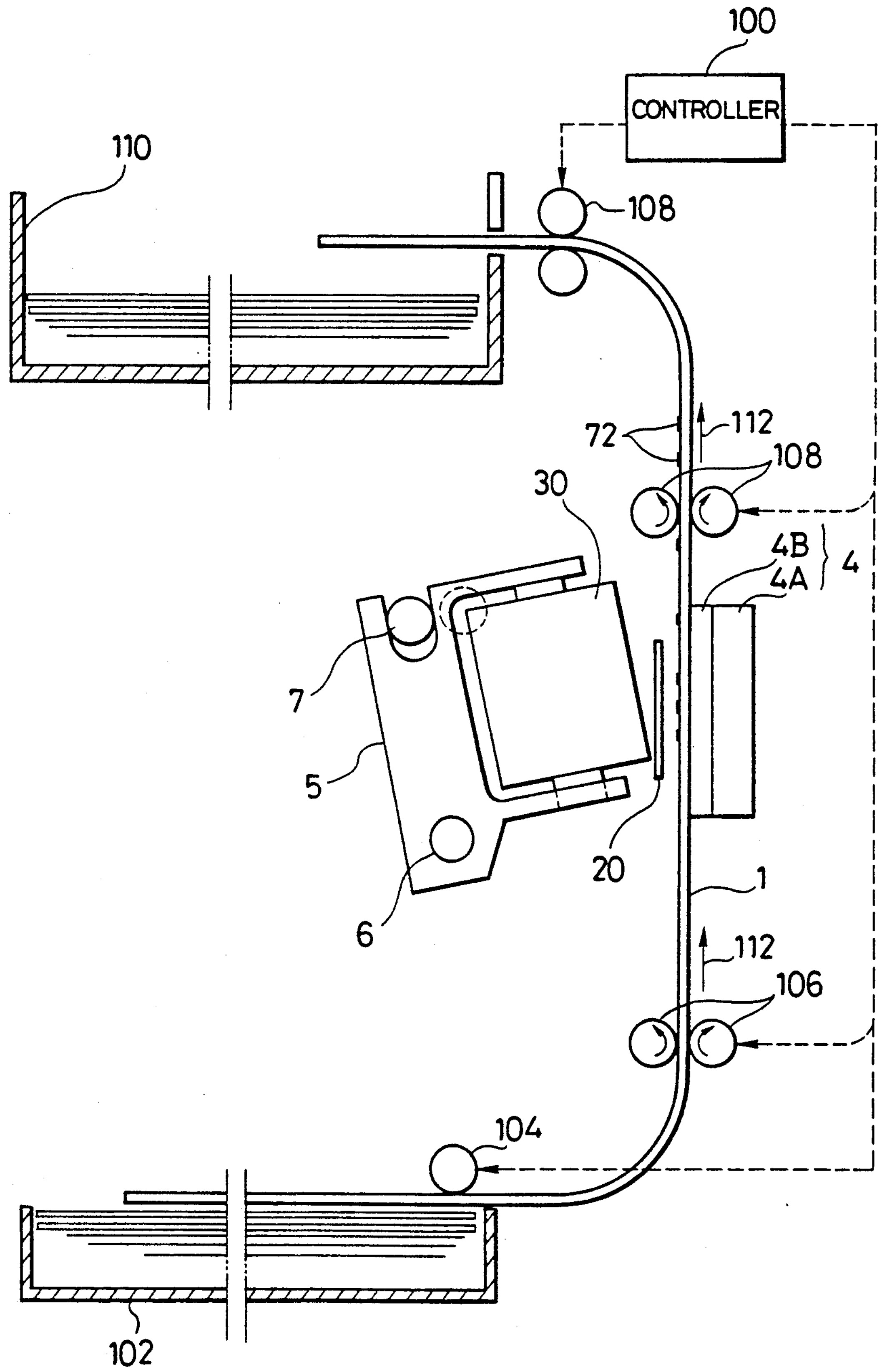
fig. 2 is a side view of the printer.

Referring to the figures, the electrophotographic printer of this embodiment comprises a flat platen 4, on which a recording paper 1 is placed. The recording paper 1 is fed in the direction of arrow 112 (FIG. 2) from a paper cassette 102, by a paper pick-up roller 104, and paper advance rollers 106. As the recording paper 1 is passed over the platen 4 it is moved along the surface of the platen 4 in a paper-feed direction (vertical as seen in FIG. 2), After the printing, the paper 1 is fed in the direction of arrow 112 (FIG. 2) and ejected by paper eject rollers 108 onto a stacker 110. The operation of the rollers 104 to 108 are controlled by a controller 100. The recording paper is fed intermittently in a manner later described.

The flat platen 4 comprises a metallic supporting plate 4A and a heat-resistant elastic layer 4B (both in FIG. 2)made for example of silicone rubber (or other material possessing both heat resistance and elasticity), and laid on the supporting layer 4A. the platen 4 extends to cover the full width of the paper 1, i.e., the dimension perpendicular to the paper-feed direction. The dimension of the platen 4 in the direction of the paper feed is sufficient to cover the "height" of each scan, that is, the dimension in the paper-feed direction that is printed during each scan of a carriage 5 in the spacing direction SP, i.e., in the direction of the width of the paper 1. This spacing direction is along the surface of the platen 4, and is at an angle, typically at a right angle, with the paper-feed direction.

Figure 6:
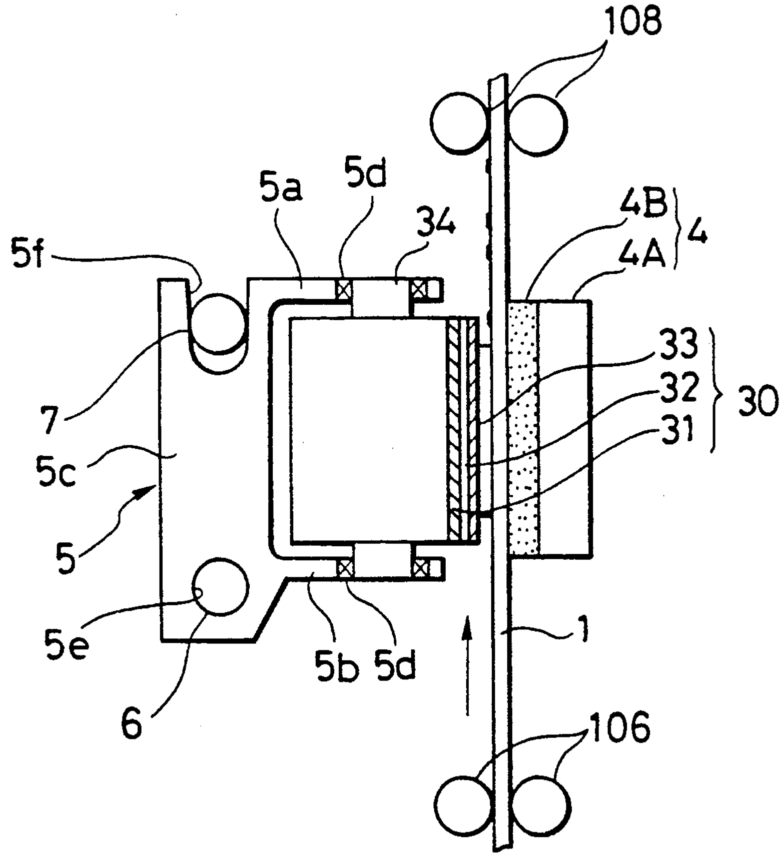
FIG. 6 is a side view showing the transfer section of the electrophotographic printer of the embodiment of the invention during the toner image transfer phase.

The carriage 5 has an upper plate 5*a*, a lower plate 5*b*, and a rear bridging part 5*c* bridging the upper and the lower plates 5*a* and 5*b* (FIG. 6). Extending respectively through a cylindrical hole 5*e* and a U-shaped cut-away 5*f* in the bridging part 5*c* are guide shafts 6 and 7. The guide shafts 6 and 7 extend in the spacing direction. The guide shaft 6 has its ends fixed to side frames 114. The guide shaft 7 has its end supported and moved by actuators 130, mounted to the side frames 114, and is movable between a first or advanced position (having moved clockwise or to the right) shown in FIG. 6, and a second or retracted position (having moved counterclockwise or to the left) shown in FIG. 7.

Figure 5:
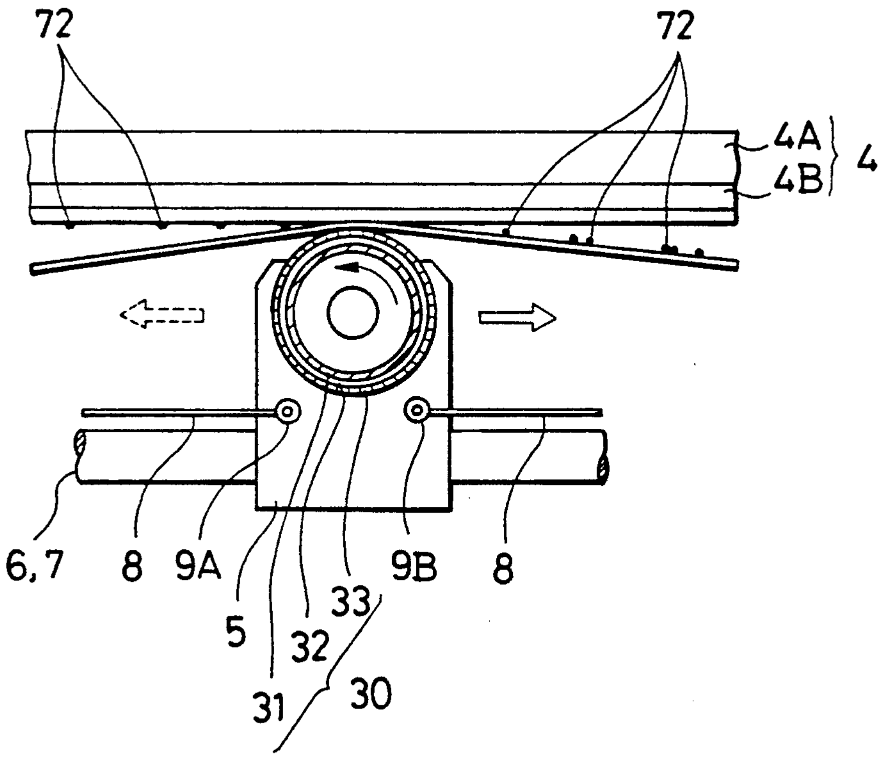
FIG. 5 is a diagram showing a plan view of the transfer section of the electrophotographic printer of the embodiment of the invention.

When the guide shaft 7 is in the advanced position, the carriage 5 is in a first or advanced position in which the carriage 5 is pressed against the recording paper 1 on the platen 4 (FIG. 5), and when the guide shaft 7 is in the retracted position, the carriage 5 is in a second or retracted position in which it is separated from or released from being pressed against the recording paper 1 on the platen 4 (FIG. 2).

The carriage 5 is supported such that it is movable back and forth along the guide shafts 6 and 7 in the spacing direction, and movable between the advanced and retracted positions.

Figure 1:
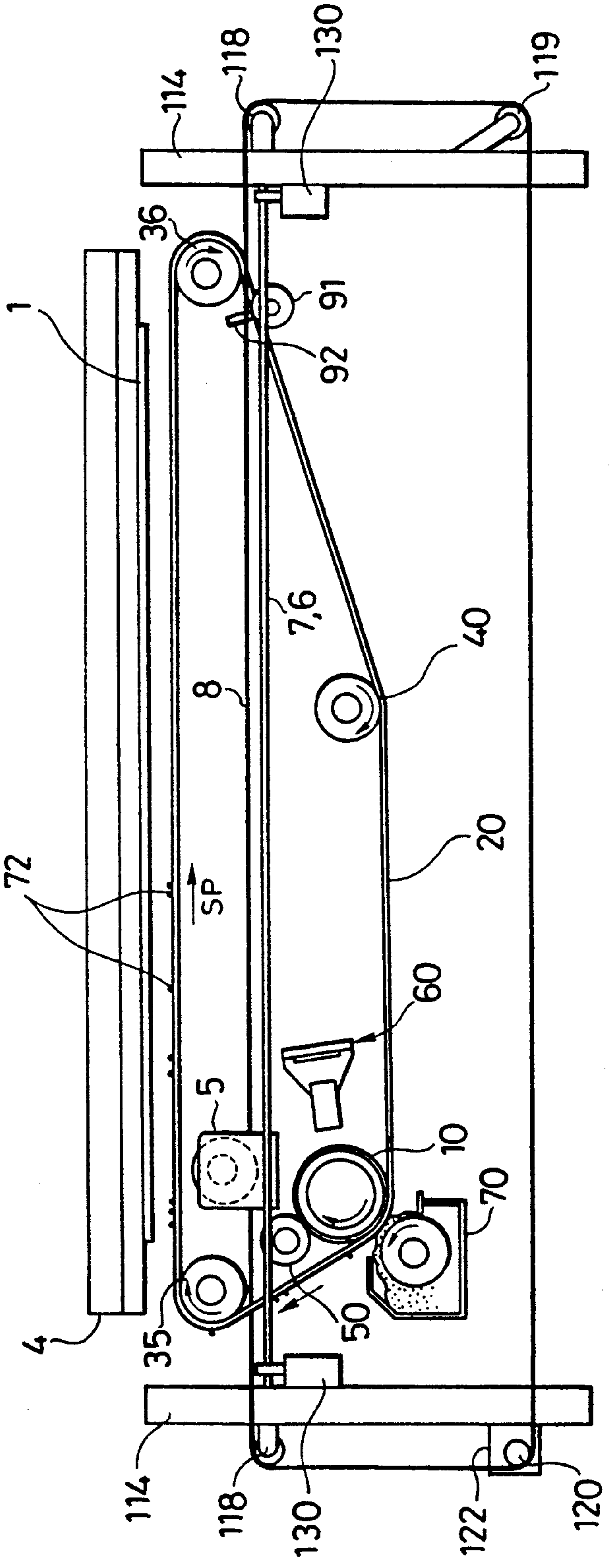
FIG. 1 is a plan view of an electrophotographic printer of an embodiment of the invention.

A wire 8 (FIG. 5) is provided for moving the carriage 5 in the spacing direction. One end of the wire 8 is fixed to a pin 9A on the left side of the carriage 5, and the other end of the wire 8 is fixed to a pin 9B on the right side of the carriage 5. The wire 8 is passed around free pulleys 118 (FIG. 1) and a tension pulley 119 which are mounted on the side frames 114, and wound on and pulled by a drive pulley 120 also mounted on the side frames 114. The drive pulley 120 is driven by a stepping motor 122, the rotation of which is controlled by the controller 100.

Mounted on the carriage 5 is a transfer roller 30 (FIG. 2) having an axis parallel (when the carriage 5 is in the advanced position) with the surface of the platen 4 and at an angle, typically at a right angle, with the spacing direction. The transfer roller 30 has a shaft 34 (FIG. 6) which is rotatably supported by bearings 5*d* mounted on the upper and the lower plates 5*a* and 5*b*.

The transfer roller 30 and part of the platen 4 facing the transfer roller 30, in combination, form a transfer and fixing section 3, as will be more apparent from the following description.

An electrostatic latent image carrier in the form of a photosensitive drum 10 (FIG. 1) is mounted to a structure which is not illustrated and which is fixed relative the side frames 114. The photosensitive drum 10 is so disposed that its axis of rotation is parallel with the axis of the transfer roller 30 when the carriage 5 is in the advanced position.

The photosensitive drum 10 comprises a photoconductive layer laid on a conductive supporting member, and may be made up of a selenium photosensitive material, an organic photosensitive material, a zinc oxide photosensitive material, an amorphous silicon phototsensitive material, or the like.

A toner image bearing belt, in the form of an endless belt 20 is passed around the photosensitive drum 10, guide rollers 35 and 36, and a tension roller 40, passing between the transfer roller 30 and the platen 4. The guide rollers 35 and 36 are disposed on respective sides of the platen 4 having their axes of rotation parallel with the axis of the transfer roller 30 (in the advanced position) such that the toner image bearing belt 20 extends parallel with and proximate to the surface of the platen 4, and in the direction of the spacing-movement.

The toner image bearing belt 20 is in contact, on a first or inner surface thereof, with the peripheral surface of the photosensitive drum 10 over a portion of the photosensitive drum arc, and as the photosensitive drum 10 rotates, being driven by a means not shown, the toner image bearing belt 20 moves together with and at the same speed as the photosensitive drum 10 because of the friction between the toner image bearing belt 20 and the photosensitive drum 10. Toner images are formed on the toner image bearing belt 20, in a manner later described.

The tension roller 40 is provided with a tension mechanism, not shown, in order to apply an appropriate tension to the toner image bearing belt 20.

A post-fixing cleaner 90 (FIG. 3) for toner image bearing belt 20 is provided to face the toner image bearing belt 20 at a location where the toner image bearing member has separated from the platen 4, and has passed the guide roller 36, in the vicinity of guide roller 36 on the side to which toner adheres. The post-fixing cleaner 90 is for removing any residual toner after the transfer as will be more apparent later. The post-fixing cleaner 90 is composed of a cleaning pad 91 made of felt or similar material, and a heating element 92 provided on the opposite side. It is possible to select one of two positions for the cleaning pad 91 and the heating element 92 relative to toner image bearing belt 20, in contact and not in contact.

Figure 3:
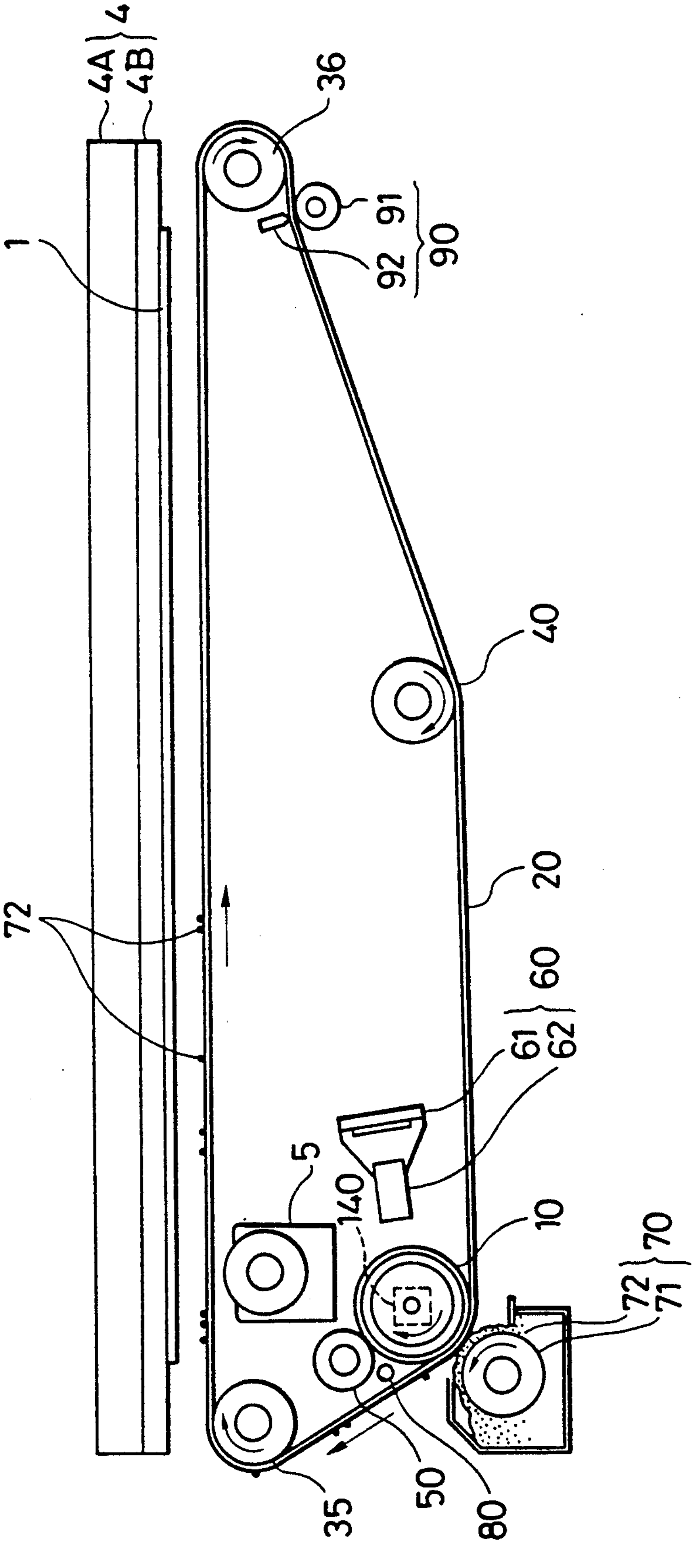
FIG. 3 is a plan view showing pertinent components of the embodiment of the invention during a toner image formation phase with the carriage being separated form the toner image bearing member.

As the photosensitive drum 10 rotates, its surface sequentially passes various processing sections or devices, namely a charging device 50, an exposure device 60, a developing device 70, and a discharge lamp 80 (FIG. 3).

Between the location where the exposure device 60 confronts the photosensitive drum 10 and the location where the developing device 70 confronts the photosensitive drum 10, the toner image bearing belt 20 is brought into contact with the photosensitive drum 10. Between the location where the developing device 70 confronts the photosensitive drum 10 and the location where the discharge lamp 80 confronts the photosensitive drum 10, the toner image bearing belt 20 is separated from the photosensitive drum 10.

The charging device 50 is provided in opposition to the surface of the photosensitive drum 10 to uniformly charge the surface of the photosensitive drum 10. The charging device 50 may be made up of a conductive roller comprising a conductive rubber laid on a metallic conductive shaft. A brush charger, or a corona charger may be used instead.

The charging device 50 comprises a metallic electrically-conductive shaft laminated with an electrically conductive roller made of conductive rubber. It is also possible to use a brush charging device or corona charging device. Referring to FIG. 3, the exposure device 60 exposes the surface of the photosensitive drum 10 to a light image or radiation pattern into which the electrical signal representing the image has been converted. The light image is emitted from an LED array 61 consisting of a number of LED elements arranged in a column extending in parallel with the axis of the photosensitive drum 10. The number of LED elements in the array is 256, for example, when the density is about 240 DPI (dots per inch). As a means for image-formation, a rod lens (Selfoc lens, tradename) 62 is inserted between the LED array 61 and the surface of the photosensitive drum 10.

By the irradiation of the light image, a linear electrostatic latent image produced by the column of LED elements is formed on the photosensitive surface of the photosensitive drum 10. As the photosensitive drum 10 rotates the light image irradiated from the LED array is altered so that the sequence of linear light images developed in the circumferential direction of the photosensitive drum 10 form a two-dimensional image which corresponds to the desired print-out.

The areas or dots of the photosensitive surface which has been irradiated by light is discharged, while the areas or dots of the photosensitive drum which have not been irradiated is kept charged. This does not mean that each area can assume either of the two distinct states: charged and discharged: there can be intermediate states and each area is discharged to the degree which is dependent on the density of the corresponding area of the light image. However, the following description will be made assuming that the latent image consists of charged areas and discharge areas, for simplicity of explanation and illustration.

The developing device 70 is provided to face the toner image bearing belt 20 passing over the photosensitive drum 10. In other words, it is provided to face the photosensitive drum 10 through the toner image bearing belt 20. The developing device 70 is provided with a toner carrier 71 which rotates attracting toner 72 on to its surface, and transports it in the direction of the arrow in FIG. 3. The toner image bearing belt 20 develops the electrostatic latent image to form a toner image corresponding to the electrostatic latent image on the photosensitive drum 10.

In the present embodiment, a reversal development is employed, and a bias voltage is applied across the conductive supporting member of the photosensitive drum 10 and the toner carrier 71. With such a construction, due to the electrostatic latent image on the photosensitive drum 10, electric lines of force are created in the space between the toner carrier 71 and the toner image bearing belt 20 and penetrate the toner image bearing belt 20. As a result, the charged toner 72 on the toner carrier 71 is attracted to the parts of the toner image bearing belt 20 corresponding to the parts of the photosensitive drum 10 where the electric charges are lost, to form a toner image.

The toner carrier 71 may be driven by mechanically transmitting the rotation of the photosensitive drum 10 to the toner carrier 71, by means not shown, or by a separate drive means not shown.

The developing device 70 may alternatively by any of a two-component magnetic brush developer, a one-component magnetic brush developer, a one-component nonmagnetic developer, and the like.

The discharge lamp 80 is provided to face the photosensitive drum 10 that has passed over the development section, and is separated from the toner image bearing belt 20. The discharge lamp 80 irradiates the entire width of the photosensitive drum 10 to remove any residual charge from the surface of the photosensitive drum 10.

As is shown in greater detail in FIG. 6, the transfer roller 30 comprises a support member 31 in the form of a hollow sleeve made of a glass material, a ceramic material or a metallic material having its surface enameled, and a resistive layer 32 and an insulating layer 33 laid in turn on the enameled surface. The resistive layer 32 is fed with an electric current from a current supply means, not shown, to generate heat.

The toner image bearing belt 20 is required to provide electrical insulation during the developing process, and heat resistance during the transfer process. When these are considered, materials suitable to the toner image bearing belt are polyester, polyimide, polyetherimide, polyethersulfone, polyetheretherketone and the like.

The width of the toner image bearing belt 20 is set as the amount that allows recording of a single line, for example, larger than the length of light emission of the LED chip to be discussed later.

Following is a description of the operation of the embodiment described above.

Printing on the recording paper 1 is accomplished by a combination of a toner image formation process or phase in which a toner image is formed on the toner image bearing belt 20, and a transfer process or phase in which the toner on the toner image bearing belt 20 is transferred to the recording paper 1.

Figure 7:
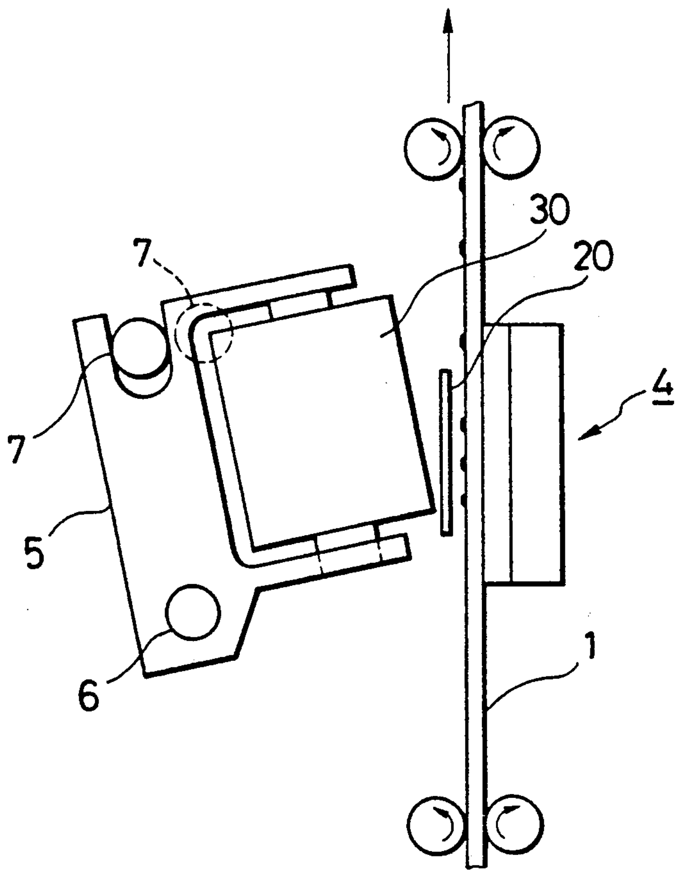
FIG. 7 is a side view showing the transfer section of the electrophotographic printer of the embodiment of the invention during the toner image formation phase.

First, in the toner image formation phase, the transfer roller 30 is released from being pressed against platen 4, as shown in FIG. 7, as a result of which, the toner image bearing belt 20 is not in pressure-contact with the recording paper 1.

The photosensitive drum 10 is rotated in the direction shown by the arrow at a constant peripheral speed by a drive means (not shown) and toner bearing belt 20 closely adheres to photosensitive drum 10 moves at the same speed as a result of friction with photosensitive drum 10. At the charging device 50, the surface of the photosensitive drum 10 is charged uniformly. At the exposure device 60, the electrostatic latent image is formed. This electrostatic latent image corresponds to the image signals supplied to the exposure device 60 from the controller 100 in synchronism with the rotation of the photosensitive drum 10.

The LED array 61 in the exposure device 60 produces one linear image consisting of an array of dots arranged in the direction of width (dimension parallel to the axis) of the photosensitive drum 10. As the photosensitive drum 10 rotates, the sequence of the linear images are formed, with the image signals supplied to the exposure device 60 being altered in synchronism with the rotation of the photosensitive drum 10, resulting in a two-dimensional image.

At a location between the exposure device 60 and the developing device 70, the toner image bearing belt 20 is brought into contact with the photosensitive drum 10.

At the development device 70, a toner image corresponding to the electrostatic latent image is formed on the toner image bearing belt 20.

The toner image bearing belt 20 that has passed out of the development section is then separated from the photosensitive drum 10, and then travels to the position between the guide rollers 35 and 36 to confronts the recording paper 1 on the platen 4.

When a toner image corresponding to one complete line has been formed on toner image bearing belt 20 and the toner image has been fed to the desired position opposite to recording paper 1, the rotation of photosensitive drum 10 ceases and toner image bearing belt 20 also stops facing the recording paper 1.

The photosensitive drum 10 having been separated from the toner image bearing belt 20 after the development process, is irradiated throughout its entire surface with the discharge lamp 80 so that any residual electric charges are removed from the surface. The photosensitive drum 10 can thus be used repeatedly.

Following is a description of the toner image transfer phase.

Initially, the carriage 5 is at the left in the home position (not shown), and when the transfer process is activated, the guide shaft 7 is moved by the actuator 130 forward, i.e., rightward as seen in FIG. 6, from the position for formation of the toner shown in FIG. 7. This causes the transfer roller 30 to be pressed against the toner image bearing belt 20, and hence pressing the toner image bearing belt 20 against the recording paper 1 on the platen 4. At this time the temperature of the transfer roller 30 is set by a controller 100 to the temperature required for transfer and fixing.

Figure 4:
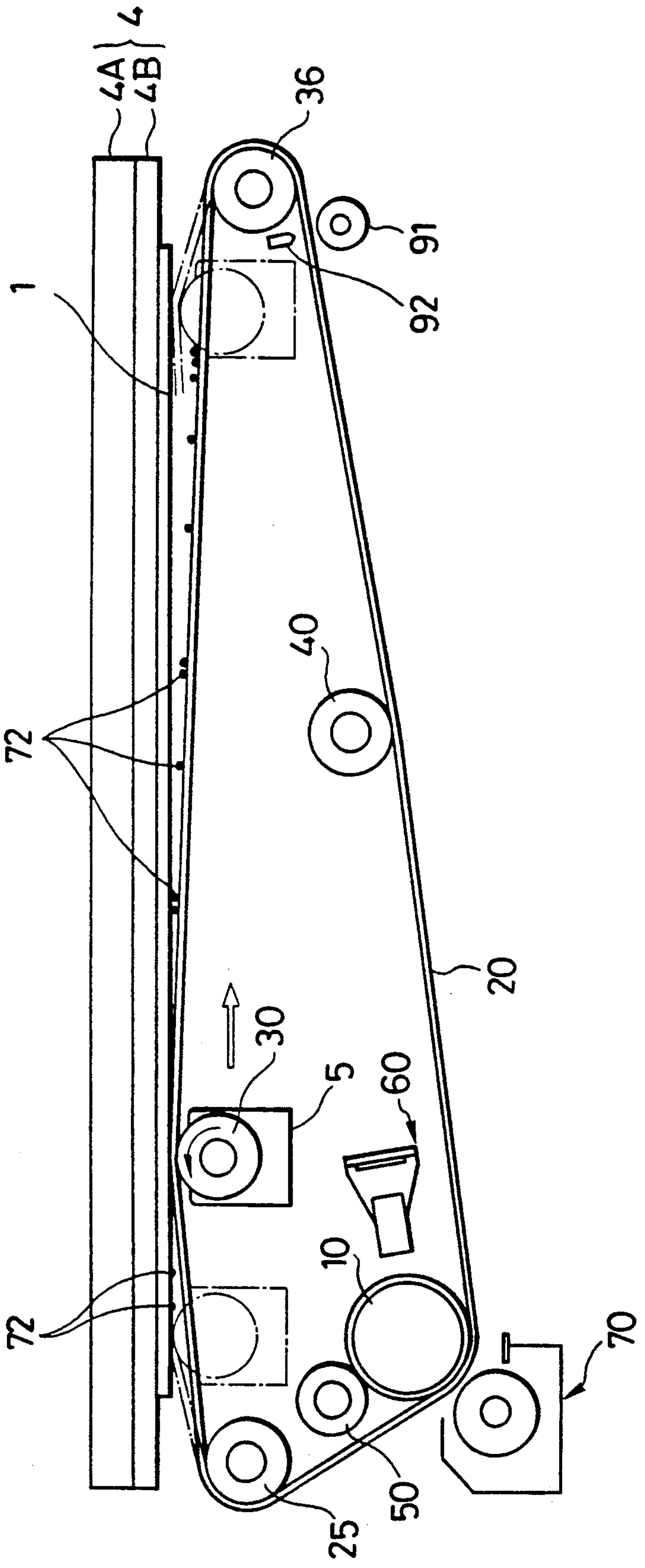
FIG. 4 is a plan view showing pertinent components of the embodiment of the invention during a toner image transfer phase with the carriage being in pressure-contact with the toner image bearing member and performing spacing-movement across the recording paper.

The carriage 5 is then pulled to the right by the wire 8 connected on the right of the carriage 5, and accompanying this rightward movement, the transfer roller 30, pressing the toner image bearing belt 20 against the recording paper 1 on the platen 4, rolls in the direction of the arrow (FIG. 4). In the course of this transfer process heat from transfer roller 30 is transmitted via the toner image bearing belt 20, melting toner 72 on the toner image bearing belt 20, and by pressure action forcing it into the fabric of recording paper 1, thereby performing transfer and fixing simultaneously.

The contact position of the recording paper 1 with the transfer roller 30 moves sequentially rightward as a result of the spacing operation of the carriage 5, simultaneously shifting the contact position of the toner image bearing belt 20 relative to the recording paper 1.

That is, each time the carriage 5 moves by a distance between adjacent columns of dots, i.e., the pitch of the dots in the spacing direction, a linear visible image of the new dot pattern is successively transferred onto the recording paper 1.

When, as described above, the carriage 5 has been moved to the specified position and the transfer of one line has been completed, the pressure holding the transfer roller 30 against platen 4 is released. During this period the recording paper 1 is also moved or line-fed to the next line to be recorded.

In this condition, the process of toner image formation is conducted for the next line, and any toner 72 remaining on the toner image bearing belt 20 from the transfer process for the previous line is removed by the cleaning pad 91, which is held against the heating element 92 by a pressurizing means (not shown). The heat from heating element 92 melts any toner 72 remaining on toner image bearing belt 20, which is cleaned by the cleaning pad 92 and is ready for the next recording.

When a toner image for one line is again formed on toner image bearing belt 20, and is transported to confront the recording paper 1, the carriage 5 is pulled leftward by the left portion of wire 8, the opposite of the case in the transferred process described above, and transfer to the recording paper 1. In this way the operations above described are repeated, to print dot patterns for further lines.

It should be noted that the present invention is not limited to the embodiment above described, and that there are a number of differing configurations consistent with the present invention, none of which are to be excluded from its scope.

Figure 8:
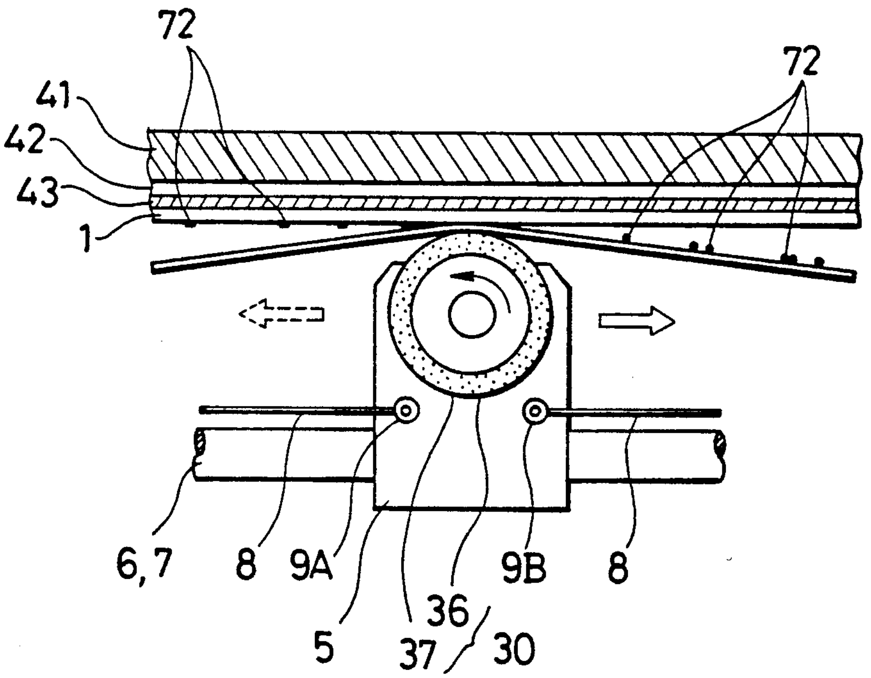
FIG. 8 is a side view showing a modification of the transfer section.

FIG. 8 is an enlarged view of a modification of the transfer section.

In this case, the heating means is provided in the platen 4. The platen 4 is comprised of a supporting plate 41 made of glass, ceramics, or metal that has been enameled, and a resistive layer 42 and an insulating layer 43 laid in turn on the supporting plate 41. The transfer roller 30 is comprised of a metallic supporting member 36, and an elastic layer 37, e.g., a silicone rubber, laid on the supporting member 36.

The adoption of such a structure eliminates the need to transmit electrical signals or provide power to the carriage 5 as it moves left and right, making electrical cables unnecessary.

Additionally, in the embodiment above described, pressure is applied to the toner image formed on the toner image bearing belt 20 and to the recording paper 1 by means of the transfer roller 30 and the platen 4, while heat is applied by a heating means provided on one or the other them, melting toner 72 on toner image bearing belt 20, transferring it to and simultaneously fixing it on recording paper 1. This could also be achieved by, instead of providing a heating means on the transfer means, providing a means for generating an electrical field between the transfer roller and the platen such that the toner on the toner image bearing belt is transferred to the recording paper by electrostatic action, and then providing a fixing means downstream from the transfer process in the direction of transport of the recording paper to fix the transferred toner to the recording paper.

The toner image bearing belt 20 need not be an endless belt as in the embodiment, but may be an ended sheet having one end on a supply roller and having the other end on a winding roller.

Further, in the embodiment above described, transfer roller 30 is disposed on carriage 5 and is of the roller type, but there is no limitation in this regard. For instance, in place of the transfer roller 30, a transfer member may be used which is in the shape of a wire or a strip arranged to extend in the direction of the width of the toner image bearing belt and mounted to be pressed against the platen, and is formed to generate heat.

As has been explained in detail above, in accordance with the present invention, only the transfer member is mounted on a carriage moving at a right angle to the direction of travel of the recording paper, thereby simplifying the carriage structure. When a transfer roller is used in the transfer section, its rotation is accomplished by friction resulting from contact with the platen during movement of the carriage, and the exposure means is not mounted to the carriage, thereby rendering unnecessary both a rotational transmission means and a high-voltage supply cord.

A heating means may be provided on the platen side, eliminating the need for electrical cables to transmit signals or power to the laterally moving carriage.

Since the carriage can be made lighter, a more compact drive source can be used to move it, reducing the cost of the device.

Since transfer to the recording paper is accomplished by a heating and pressurizing action, any heat-fusible toner can be used. There is therefore no limitation to magnetic toners.

A one-chip LED array can be used as the light source in the LED array. Moreover, any type of toner of the heat-melting type other than the magnetic toner may be used. Furthermore, at the time of transfer of the toner image, the toner image previously recorded is not disturbed even if there is a friction. The cost of the apparatus can be decreased. In addition, the recording speed can be increased by printing while the carriage is moving in either direction.

What is claimed is:

1. An electrophotographic printer comprising:

(a) a platen having a surface;

(b) paper feed means for feeding a recording paper having a surface over said platen along the surface of said platen in a first direction;

(c) a toner image bearing member extending along the surface of the recording paper on said platen, said toner image bearing member extending in a second direction at an angle with respect to said first direction;

(d) driving means for forming a toner image on part of said toner image bearing member, and for moving said part of the toner image bearing member on which the toner image has been formed in the second direction to a position confronting the recording paper on said platen, and for halting movement of the toner image bearing member when said part of the toner image bearing member has reached said position;

(e) a transfer member disposed opposite to the recording paper with respect to the toner image bearing member;

(f) space-driving means for moving said transfer member in said second direction after said part of said toner image bearing member has reached the position confronting the recording paper;

(g) actuator means for causing the transfer member to press said toner image bearing member against the recording paper over said platen while said space driving means moves said transfer member in said second direction, thereby transferring the toner image from the toner image bearing member to the recording paper, wherein said driving means for forming a toner image on said toner image bearing member comprises:

an electrostatic latent image carrier having a surface;

means for forming an electrostatic latent image on said surface of said electrostatic latent image carrier;

said toner image bearing member contacting part of said surface of said electrostatic latent image carrier on which the electrostatic latent image has been formed; and developing means disposed to face the toner image bearing member and passing over said electrostatic latent image carrier for developing the toner image on said toner image bearing member.

2. The printer of claim 1, wherein said actuator means comprises means for releasing the transfer member from pressing said toner image bearing member against the recording paper over said platen when said toner image bearing member is moving in said second direction.

3. The printer of claim 1, wherein said toner image bearing member comprises a toner image bearing belt; and first and second rollers disposed on respective sides of the recording paper so that said toner image bearing belt passes around said first and second rollers and extends from said first roller to said second roller.

4. The printer of claim 3, wherein said toner image bearing belt comprises an endless belt.

5. The printer of claim 1, wherein said means for forming an electrostatic latent image comprises:

charging means for charging the surface of said electrostatic latent image carrier; and exposure means for exposing the electrostatic latent image carrier having been charged, thereby forming the electrostatic latent image.

6. The printer of claim 5, wherein said means for forming an electrostatic latent image further comprises means for supplying image signals to said exposure means in timed relationship with movement of said electrostatic latent image carrier.

7. The printer of claim 1, wherein said paper feed means feeds the recording paper in said first direction, as the movement of said transfer member in said second direction is completed, and printing of one line is thereby completed.

8. The printer of claim 1, further comprising a heating means disposed in said transfer member for heating the toner thereby fixing the toner image to the recording paper.

9. The printer of claim 1, wherein said electrostatic latent image carrier is a photosensitive drum.

10. The printer of claim 9, wherein said means for forming an electrostatic latent image comprises;

charging means for charging the surface of said electrostatic latent image carrier; and exposure means for exposing said electrostatic latent image carrier having been charged thereby forming an electrostatic latent image, said exposure means comprising a plurality of LED elements arranged in a column parallel to the axis of the photosensitive drum.

11. An electrophotographic printer comprising:

(a) a platen having a surface;

(b) paper feed means for feeding a recording paper having a surface over said platen along the surface of said platen in a first direction;

(c) a toner image bearing member extending along the surface of the recording paper on said platen, said toner image bearing member extending in a second direction at an angle with respect to said first direction;

(d) driving means for forming a toner image on part of said toner image bearing member, and for moving said part of the toner image bearing member on which the toner image has been formed in the second direction to a position confronting the recording paper on said platen, and for halting movement of the toner image bearing member when said part of the toner image bearing member has reached said position;

(e) a transfer member disposed opposite to the recording paper with respect to the toner image bearing member;

(f) space-driving means for moving said transfer member in said second direction after said part of said toner image bearing member has reached the position confronting the recording paper;

(g) actuator means for causing the transfer member to press said toner image bearing member against the recording paper over said platen while said space driving means moves said transfer member in said second direction, thereby transferring the toner image from the toner image bearing member to the recording paper, wherein said transfer member comprises a transfer roller having an axis parallel to the surface of said platen and at an angle to said second direction when said actuator means causes said transfer roller to press said toner image bearing member against said recording paper.

12. The printer of claim 11, wherein said actuator means comprises means for releasing the transfer member from pressing said toner image bearing member against the recording paper over said platen when said toner image bearing member is moving in said second direction.

13. The printer of claim 11, wherein said toner image bearing member comprises a toner image bearing belt; and first and second rollers disposed on respective sides of the recording paper so that said toner image bearing belt passes around said first and second rollers and extends from said first roller to said second roller.

14. The printer of claim 13, wherein said toner image bearing belt comprises an endless belt.

15. The printer of claim 11, wherein said driving means for forming a toner image on said toner image bearing member comprises:

an electrostatic latent image carrier having a surface;

means for forming an electrostatic latent image on said surface of said electrostatic latent image carrier;

said toner image bearing member contacting part of said surface of said electrostatic latent image carrier on which the electrostatic latent image has been formed; and developing means disposed to face the toner image bearing member and passing over said electrostatic latent image carrier for developing the toner image on said toner image bearing member.

16. The printer of claim 15, wherein said means for forming an electrostatic latent image comprises:

charging means for charging the surface of said electrostatic latent image carrier; and exposure means for exposing the electrostatic latent image carrier having been charged, thereby forming the electrostatic latent image.

17. The printer of claim 16, wherein said means for forming an electrostatic latent image further comprises means for supplying image signals to said exposure means in timed relationship with movement of said electrostatic latent image carrier.

18. The printer of claim 11, wherein said paper feed means feeds the recording paper in said first direction, as the movement of said transfer member in said second direction is completed, and printing of one line is thereby completed.

19. The printer of claim 11, further comprising a heating means disposed in said transfer member for heating the toner thereby fixing the toner image to the recording paper.

20. An electrophotographic printer comprising:

(a) a platen having a surface;

(b) paper feed means for feeding a recording paper having a surface over said platen along the surface of said platen in a first direction;

(c) a toner image bearing member extending along the surface of the recording paper on said platen, said toner image bearing member extending in a second direction at an angle with respect to said first direction;

(d) driving means for forming a toner image on part of said toner image bearing member, and for moving said part of the toner image bearing member on which the toner image has been formed in the second direction to a position confronting the recording paper on said platen, and for halting movement of the toner image bearing member when said part of the toner image bearing member has reached said position;

(e) a transfer member disposed opposite to the recording paper with respect to the toner image bearing member;

(f) space-driving means for moving said transfer member in said second direction after said part of said toner image bearing member has reached the position confronting the recording paper;

(g) actuator means for causing the transfer member to press said toner image bering member against the recording paper over said platen while said space driving means moved said transfer member in said second direction, thereby transferring the toner image from the toner image bearing member to the recording paper; and (h) a heating means disposed in said platen for heating the toner, thereby fixing the toner image to the recording paper.

21. The printer of claim 20, wherein said actuator means comprises means for releasing the transfer member from pressing said toner image bearing member against the recording paper over said platen when said toner image bearing member is moving in said second direction.

22. The printer of claim 20, wherein said toner image bearing member comprises a toner image bearing belt; and first and second rollers disposed on respective sides of the recording paper so that said toner image bearing belt passes around said first and second rollers and extends from said first roller to said second roller.

23. The printer of claim 22, wherein said toner image bearing belt comprises an endless belt.

24. The printer of claim 20, wherein said driving means for forming a toner image on part of said toner image bearing member comprises:

an electrostatic latent image carrier having a surface;

means for forming an electrostatic latent image on said surface of said electrostatic latent image carrier;

said toner image bearing member contacting part of said surface of said electrostatic latent image carrier on which the electrostatic latent image has been formed; and developing means disposed to face the toner image bearing member and passing over said electrostatic latent image carrier for developing the toner image on said toner image bearing member.

25. The printer of claim 24, wherein said means for forming an electrostatic latent image comprises:

charging means for charging the surface of said electrostatic latent image carrier; and exposure means for exposing the electrostatic latent image carrier having been charged, thereby forming the electrostatic latent image.

26. The printer of claim 25, wherein said means for forming an electrostatic latent image further comprises means for supplying image signals to said exposure means in timed relationship with movement of said electrostatic latent image carrier.

27. The printer of claim 20, wherein said paper feed means feeds the recording paper in said first direction, as the movement of said transfer member in said second direction is completed, and printing of one line is thereby completed.

28. An electrophotographic printer comprising:

(a) a platen having a surface;

(b) paper feed means for feeding a recording paper having a surface over said platen along the surface of said platen in a first direction;

(c) a toner image bearing member extending along the surface of the recording paper on said platen, said toner image bearing member extending in a second direction at an angle with respect to said first direction;

(d) driving means for forming a toner image on part of said toner image bearing member, and for moving said part of the toner image bearing member on which the toner image has been formed in the second direction to a position confronting the recording paper on said platen, and for halting movement of the toner image bearing member when said part of the toner image bearing member has reached said position;

(e) a transfer member disposed opposite to the recording paper with respect to the toner image bearing member;

(f) space-driving means for moving said transfer member in said second direction after said part of said toner image bearing member has reached the position confronting the recording paper;

(g) actuator means for causing the transfer member to press said toner image bearing member against the recording paper over said platen while said space driving means moves said transfer member in said second direction, thereby transferring the toner image from the toner image bearing member to the recording paper; and (h) a photosensitive drum.

29. The printer of claim 28, further comprising an LED array comprised of a plurality of LED elements arranged in a column parallel with the axis of the photosensitive drum.

30. The printer of claim 28, wherein said actuator means comprises means for releasing the transfer member from pressing said toner image bearing member against the recording paper over said platen when said toner image bearing member is moving in said second direction.

31. The printer of claim 28, wherein said toner image bearing member comprises a toner image bearing belt; and first and second rollers disposed on respective sides of the recording paper so that said toner image bearing belt passes around said first and second rollers and extends from said first roller to said second roller.

32. The printer of claim 31, wherein said toner image bearing belt comprises an endless belt.

33. The printer of claim 28, wherein said paper feed means feeds the recording paper in said first direction, as the movement of said transfer member in said second direction is completed, and printing of one line is thereby completed.

34. The printer of claim 28, further comprising a heating means disposed in said transfer member for heating the toner thereby fixing the toner image to the recording paper.

* * * * *